United States Patent
Jang

(10) Patent No.: US 9,497,434 B2
(45) Date of Patent: Nov. 15, 2016

(54) METHOD AND APPARATUS FOR MULTI-PLAYING VIDEOS

(71) Applicant: Samsung Electronics Co., Ltd., Gyeonggi-do (KR)

(72) Inventor: Doyoung Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 61 days.

(21) Appl. No.: 13/892,490

(22) Filed: May 13, 2013

(65) Prior Publication Data

US 2013/0315570 A1 Nov. 28, 2013

(30) Foreign Application Priority Data

May 24, 2012 (KR) .................. 10-2012-0055434

(51) Int. Cl.
*H04N 5/93* (2006.01)
*H04N 9/79* (2006.01)
*H04N 21/432* (2011.01)
*H04N 21/44* (2011.01)
*H04N 21/431* (2011.01)
*H04N 21/482* (2011.01)
*H04N 21/8549* (2011.01)

(52) U.S. Cl.
CPC ............ *H04N 9/79* (2013.01); *H04N 21/431* (2013.01); *H04N 21/4312* (2013.01); *H04N 21/4325* (2013.01); *H04N 21/44* (2013.01); *H04N 21/44004* (2013.01); *H04N 21/482* (2013.01); *H04N 21/8549* (2013.01)

(58) Field of Classification Search
CPC ............ H04N 21/4325; H04N 9/79; H04N 21/44004; H04N 21/44

USPC .......................................................... 386/326
See application file for complete search history.

(56) References Cited

U.S. PATENT DOCUMENTS

| | | |
|---|---|---|
| 2004/0240859 A1 | 12/2004 | Karimoto et al. |
| 2007/0212028 A1 | 9/2007 | Naito |
| 2008/0028318 A1* | 1/2008 | Shikuma .............. G11B 27/034 715/744 |
| 2008/0082921 A1 | 4/2008 | Negi |
| 2009/0052542 A1 | 2/2009 | Romanovskiy et al. |
| 2009/0091635 A1* | 4/2009 | Fukuyama ......... H04N 5/23293 348/220.1 |
| 2009/0154572 A1 | 6/2009 | Baik et al. |
| 2010/0275164 A1 | 10/2010 | Morikawa |

(Continued)

FOREIGN PATENT DOCUMENTS

| | | |
|---|---|---|
| EP | 2 192 766 A2 | 6/2010 |
| GB | 2481661 A | 1/2012 |

(Continued)

OTHER PUBLICATIONS

WO 2007-055445 PCT-KR06-000611 Feb. 2006.*

*Primary Examiner* — William Tran
(74) *Attorney, Agent, or Firm* — Cha & Reiter, LLC

(57) ABSTRACT

A method of multi-playing videos in an apparatus having a first decoder for decoding a video and a controller for controlling the decoder includes determining, by the controller, whether the first decoder is in use, generating video clips by decoding a video by the controller as a second decoder if the first decoder is in use, storing video clips in a storage unit, and simultaneously playing video clips stored in the storage unit in response to detection of a preview request event.

20 Claims, 6 Drawing Sheets

(56) References Cited

U.S. PATENT DOCUMENTS

| | | | | |
|---|---|---|---|---|
| 2010/0278443 | A1* | 11/2010 | Pascali et al. | 382/233 |
| 2012/0317302 | A1* | 12/2012 | Silvestri | H04L 65/4076 709/231 |
| 2013/0132966 | A1* | 5/2013 | Chanda | H04N 21/443 718/104 |
| 2013/0279877 | A1* | 10/2013 | Boak | 386/231 |
| 2014/0085446 | A1* | 3/2014 | Hicks | G09B 21/008 348/62 |
| 2014/0237493 | A1* | 8/2014 | Russo | H04N 7/181 725/5 |

FOREIGN PATENT DOCUMENTS

| | | |
|---|---|---|
| JP | 2010-54963 A | 3/2010 |
| KR | 10-2007-0090115 A | 9/2007 |
| KR | 10-2009-0020460 A | 2/2009 |
| KR | 10-2009-0065398 A | 6/2009 |
| KR | 10-0998547 B1 | 11/2010 |
| KR | 10-1061011 B1 | 9/2011 |

\* cited by examiner

Video 1

Video 2

METHOD AND APPARATUS FOR MULTI-PLAYING VIDEOS

CLAIM OF PRIORITY

This application claims, pursuant to 35 U.S.C. §119(a), priority to and the benefit of the earlier filing date of a Korean patent application filed on May 24, 2012 in the Korean Intellectual Property Office and assigned Ser. No. 10-2012-0055434, the entire disclosure of which is hereby incorporated by reference.

BACKGROUND OF THE INVENTION

1. Field of the Invention

The present invention relates to playing videos, and in particular, to a method and apparatus for simultaneously playing a plurality of videos.

2. Description of the Related Art

A portable terminal is a necessity to modern people. That is, people of all ages and both sexes use a portable terminal, and the portable terminal is being used for a voice call and information exchange. In the early times of distribution of portable terminals, a portable terminal was recognized as a simple portable device allowing a wireless call, but along with the development of technologies, the portable terminal now provides various services and functions. For example, the portable terminal in the prior art provides various functions such as an electronic phone book, an electronic game, a short message application, an e-mail application, a reminder function such as a morning call, a music player, a schedule management system, a digital camera, wireless access to networks including the Internet, etc. as a multimedia device.

The portable terminal in the prior art may include a hardware-based decoder for decoding videos (e.g., an MPEG-formatted video, an AVI-formatted video, etc.), and a touch screen for digital-to-analog (D/A) converting decoded videos and displaying the converted videos, thereby replaying videos. Further, a portable terminal in the prior art includes a high performance processor, and thus the portable terminal in the prior art can simultaneously and quickly perform various functions.

The portable terminal in the prior art may simultaneously replay several videos. For example, the portable terminal may detect a preview request event from a touch screen, e.g., activation of a "preview" button tab displayed on a touch screen. In response to the preview request event, the portable terminal performs time division for videos and sequentially decodes the time-divided videos. Thereafter, the portable terminal down-converts the size of decoded videos (i.e., the size displayed on the screen), and temporarily stores the videos in a storage unit. Thereafter, the portable terminal may simultaneously display temporarily stored videos.

However, such a simultaneous replay method requires buffering time (e.g., decoding time), and thus a user may feel uncomfortable with the delay of the replay. In other words, the high performance of the portable terminal in the prior art may not be intuitively shown to the user.

SUMMARY OF THE INVENTION

The present invention has been made in view of the above problems, and an object of the present invention is to provide a method and apparatus for intuitively showing the high performance of a portable terminal by simultaneously replaying a plurality of videos without buffering time.

In accordance with an aspect of the present invention, a method of multi-playing videos in an apparatus having a first decoder for decoding a video and a controller for controlling the decoder includes: determining, by the controller, whether the first decoder is being used; generating video clips by decoding a video using the controller as a second decoder if the first decoder is being used; storing video clips in a storage unit; and simultaneously playing video clips stored in the storage unit in response to detection of a preview request event.

In accordance with another aspect of the present invention, a method of multi-playing videos in an apparatus having a first decoder for decoding videos and a controller for controlling the first decoder includes: playing videos by controlling the first decoder by the controller; generating video clips by decoding and reducing a video being played for each chapter; storing the video clips in a storage unit; and simultaneously playing the video clips stored in the storage unit in response to detection of a preview request event.

In accordance with another aspect of the present invention, an apparatus for multi-playing videos includes: a storage unit for storing videos and video clips that are a part or a whole of the respective videos; a first decoder for decoding videos; a display unit for displaying the decoded videos; and a controller for controlling the storage unit, the first decoder and the display unit, wherein the controller determines whether the first decoder is being used, generates video clips by decoding videos if the first decoder is being used, stores the video clips in the storage unit, and simultaneously plays the video clips stored in the storage unit in response to detection of a preview request event.

In accordance with another aspect of the present invention, an apparatus for multi-playing videos includes: a storage unit for storing videos and video clips that are a part or a whole of the respective videos; a first decoder for decoding videos; a display unit for displaying the decoded videos; and a controller for controlling the storage unit, the first decoder and the display unit, wherein the controller controls the first decoder to play the videos, decodes and reduces the videos being played for each chapter, and simultaneously plays the video clips in response to detection of a preview request event from the display unit.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
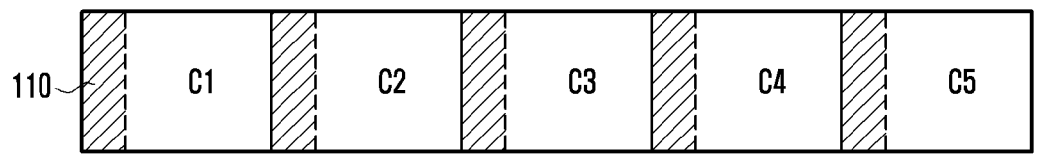
FIG. 1 illustrates examples of video clips according to the present invention.
Figure 1:
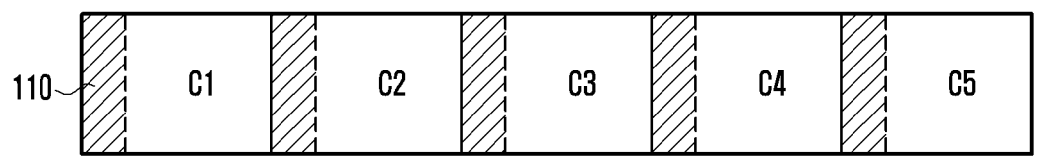

A method and apparatus for multi-playing videos according to the present invention may be applicable to multimedia devices such as a smart phone, a tablet PC, a notebook computer, a TV, a navigation system and a video phone, etc. Further, the method and apparatus may also be applicable to a fusion device combined with a multimedia device (e.g., a refrigerator having a communication function and a touch screen).

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

FIG. 1 illustrates examples of video clips according to the present invention.

In the present invention, a "video clip" may have been decoded by a hardware-based decoder or a software-based decoder partially or as a whole. Further, the video clip may have been resized to a size different from its original size, such as being reduced to a smaller size. That is, the video clip may be a thumbnail of the original video. For example, the size of the video clip may be 304*208 pixels or 336*208 pixels. In addition, when the clip is not reduced, the size of the video clip may be the same as that of the original video. The video clip may be stored in a storage unit separate from the original video. When the original video is deleted, the corresponding video clip may also be deleted. Further, when the replay of the original video is completed, the corresponding video clip may be deleted (i.e., temporarily stored and deleted after being played). Further, the video clip may be deleted based on a predetermined time, a replay frequency, a memory space capacity limit, etc. For example, if two days have passed from the time when the clip was stored, the video clip may be deleted automatically. Alternatively, if the clip is not played within two days from the time when the clip was stored, the clip may be deleted automatically. If the memory space has been reduced to less than 500 MB, the video clips that have been stored more than one day may be deleted automatically.

Figure 2:
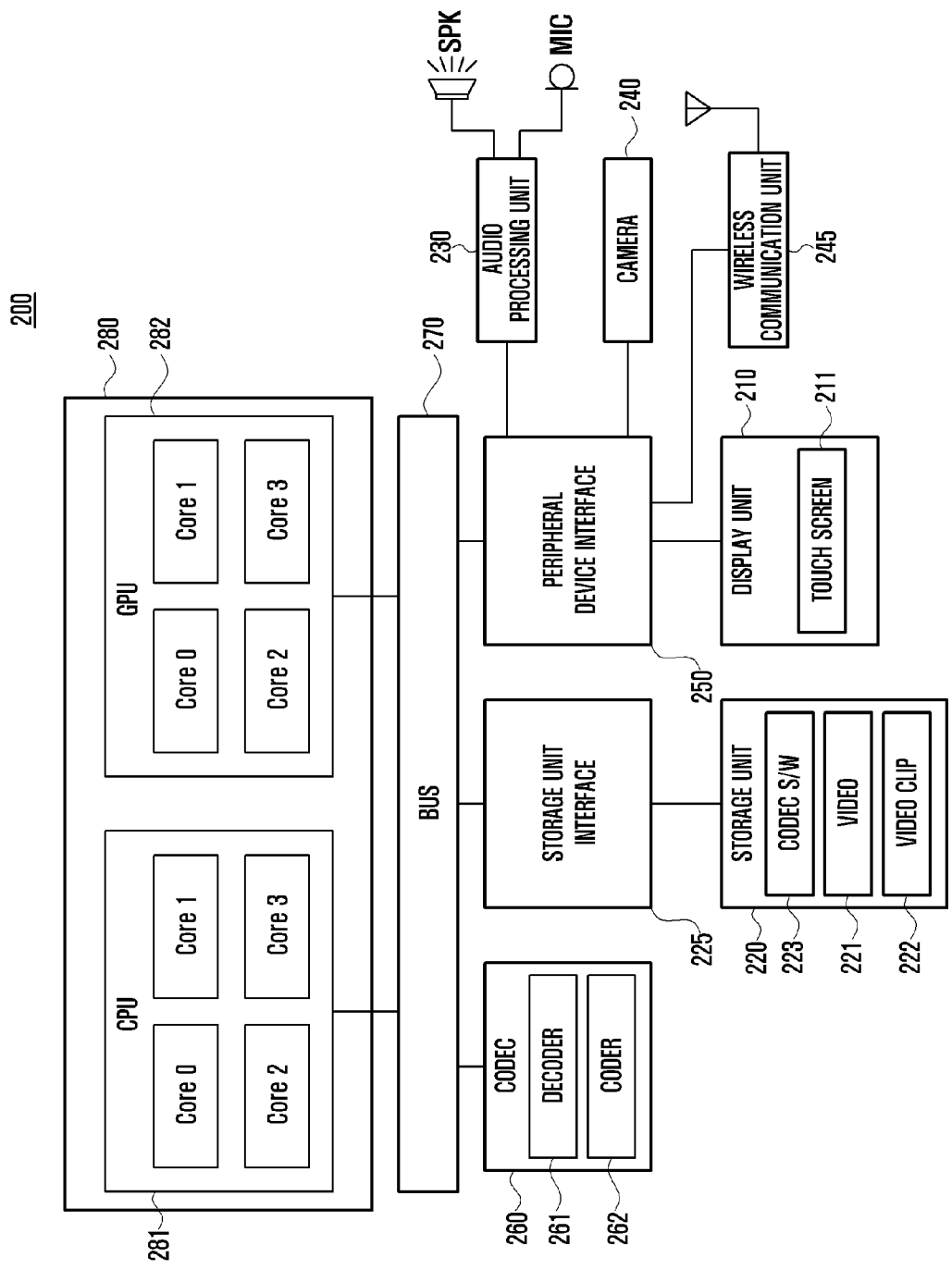
FIG. 2 is a block diagram of an apparatus for multi-playing videos according to an exemplary embodiment of the present invention.

Referring to FIG. 1, the first video (video 1) and the second video (video 2) may be stored in the storage unit, such as the storage unit 220 in FIG. 2. The videos (video 1 and video 2) may respectively include a plurality of chapters (e.g., labeled C1 to C5). Here, chapters may be divided by time. For example, the play time of one chapter may be 10 minutes. The video clip 110 may be generated for each video, and may be particularly generated for each chapter of a video. Here, only a part of one chapter (e.g., first 10 seconds of 10 minutes that is the play time of the chapter) may be converted into a video clip. In addition an entire chapter or the entire video may be converted into a video clip. The video clip may be generated during, for example, idle time of the overall video play apparatus, for example, when a video play apparatus is being charged and the display unit is in an off state. The video clip may be generated when a thumbnail view or chapter view mode is executed in a video play application. The video clip may be generated when a video is played because the video clip occupies the entire screen in the play application.

FIG. 2 is a block diagram of an apparatus 200 for multi-playing videos according to the exemplary embodiment of the present invention.

Referring to FIG. 2, the apparatus 200 may implement, for example, an electronic device such as a portable terminal or mobile device, and the apparatus 200 may include a display unit 210, a storage unit 220, a storage unit interface 225, an audio processing unit 230, a speaker (SPK), a microphone (MIC), a camera 240, a wireless communication unit 245, a peripheral device interface 250, a CODEC 260, a bus 270 and a controller 280.

The display unit 210 converts image data input from the CODEC 260 or the controller 280 into analog signals, and displays the signals under the control of the controller 280. That is, the display unit 210 may display various screens according to the use of the apparatus 200, such as a lock screen, a home screen, an application (App) screen and a keypad screen. The lock screen may be defined as an image displayed on the display unit 210 when the display unit 210 is turned on. If a touch gesture for releasing the lock is detected, the controller 280 may change the displayed image to a home screen or an application execution screen, etc. The home screen may be defined as an image including a plurality of application icons corresponding to a plurality of applications.

If one of a plurality of applications is selected by a user (e.g., an application icon is tapped), the controller 280 may execute a corresponding application (e.g., a video player), and may display the execution screen on the display unit 210. The controller 280 may detect a preview request event (e.g., a tap of "video preview" button in the video player execution screen) while a video is played. The controller 280 plays video clips respectively corresponding to a plurality of videos stored in the storage unit 220 in response to the detection of a preview request event. That is, the controller 280 displays a plurality of video clips stored in the storage unit 220 on the display unit 210. The display panel, which may include or be connected to a touch screen 211 of the display unit 210, D/A-converts (digital/analog converts) video clips received from the controller 280 into, and displays the converted clips.

The display unit 210 may display one of the screens as the background and may overlap another screen, as the foreground, onto the background. For example, the display unit 210 may display an application execution screen and may display a keypad, as a keypad screen or a keypad window, on the application execution screen. Further, the display unit 210 may display a plurality of screens under the control of the controller 280. For example, the display unit 210 may display a video on a first display area, and may display video clips for each chapter, related to the video being displayed, on a second display area different from the first display area.

The display unit 210 may be implemented in the form of a flat display panel such as a liquid crystal display (LCD), an organic light emitted diode (OLED), or an active matrix organic light emitted diode (AMOLED).

The display unit 210 may include the touch screen 211 to provide a user interface for interaction with the user. The touch screen 211 may be placed on or incorporated in the display unit 210. Specifically, the touch screen 211 may be implemented as an add-on type placed on the display unit 210, and/or as an on-cell type or in-cell type inserted into the display unit 210.

The touch screen 211 may generate an analog signal (e.g., a touch event) in response to the user's gesture on the touch screen 211, and may analog-to-digital convert (A/D convert) the analog signal and transmit the converted signal to the controller 280. The controller 280 detects the user's gesture from the transmitted touch event. That is, the controller 280 may control the components by detecting the touched point, the moving distance of the touch, the moving direction of the touch, the speed of the touch and the pressure of the touch, etc. The user's gesture is divided into a touch and a touch gesture. Further, the touch gesture may include a tap, a double tap, a long tap, a drag, a drag and drop, a flick, a press, etc. Here, the touch is an operation of contacting one point of the screen using a touch input member (e.g., a finger, a stylus pen, or a known non-electronic or electronic device for inputting a touch), the tap is an operation of touching one point with the touch input member and then removing the touch of the touch input member from the point without moving the touch input member, the touch tab is an operation of consecutively performing the tap operation twice at one point, the long tap is an operation of touching one point for relatively a long time and then removing the touch of the touch input member at the point without moving the touch input member, the drag is an operation of moving the touch input member in a predetermined direction in a state where a certain point has been touched, the drag and drop is an operation of dragging and then removing the touch input member, and the flick is an operation of quickly moving the touch using the touch input member compared to the drag, and then removing the touch. The press is an operation of inputting a touch at one point with the touch input member and pushing the point. That is, the touch input member is in a state in which the contact with the touch screen is maintained, and the touch gesture is a movement of a touch from the input of the touch (touch-on) to the removal (touch-off) of the touch.

Touch screen 211 may sense the pressure on the touched point by including a pressure sensor. The sensed pressure information may be transmitted to the controller 280, and the controller 280 may distinguish the touch from the press based on the sensed pressure information. A resistive type, a capacitive type and an electromagnetic induction type, etc. may be used to implement the touch screen 211.

The storage unit 220 may store data generated in the apparatus 200 (e.g., photographing an image or capturing video as video images, and generating corresponding image data using the camera 240) or received from an external source through the wireless communication unit 245, such as various videos 221. Further, the storage unit 220 may store video clips 222 generated by the controller 280 or the CODEC 260. Such video clips 222 correspond to the videos 221, respectively. Further, the storage unit 220 may store data for configuring and displaying the lock screen, the home screen, the keypad screen, etc. Further, the storage unit 220 may store various setting values for operation of the apparatus 200 (e.g., the brightness of the screen, whether a vibration occurs at the time of a touch, whether the screen is automatically rotated, etc.).

The storage unit 220 stores various programs. Specifically, the storage unit 220 may include an operating system for booting and operating the apparatus 200, a communication program, an image processing program, a display control program, a user interface program, an embedded application, and a third party application.

The communication program includes a command for allowing communication with an external device through the wireless communication unit 245. The graphic processing program includes various software components (e.g., modules for converting the image format, adjusting the size of the graphic image to be displayed, rendering, and determining the luminance of a backlight unit including in the display unit 210, etc.) for processing the graphic image to be displayed on the display unit 210. Here, the graphic image may include a web page, an icon, a picture, a video and an animation, etc. Further, the graphic processing program may include a software CODEC 223; that is, a CODEC implemented solely using software. The term "software" is abbreviated as "S/W" herein and in the drawings, such as in FIGS. 2-3, while the term "hardware" is abbreviated as "H/W" herein and in the drawings, such as in FIG. 3. The software CODEC 223 includes a command for allowing the controller 280 to function as a decoder for decoding a video and a command for allowing the controller 280 to function as a coder for coding the video (encoding; e.g., compressing the video to a format such as AVI and MPEG, etc.). That is, the controller 280 may perform a function of a decoder and a coder using software CODEC 223, so that the controller 280 operates as a software-based decoder and/or a software-based coder.

The user interface program includes various software components related with the user interface. The embedded application is an application that is mounted on the apparatus 200 as a basic setting. For example, the embedded application may be a browser, an e-mail application, an instant messenger application, etc. A third party application is an application that may be downloaded from an online market and may be installed in the apparatus 200. Such a third party application may be freely installed and deleted. For example, the third party application may be an application or app for accessing social networking services, such as FACEBOOK, commercially available from FACEBOOK, INC., and TWITTER, commercially available from TWITTER, INC., etc.

The storage unit interface 225 connects the storage unit 220 to the wireless communication unit 245, the CODEC 260, and the controller 280 via the bus 270.

The audio processing unit 230 is connected to at least one of a speaker (SPK) and a microphone (MIC), and performs an input and output function of an audio signal for voice recognition, voice replication, digital recording and a phone function. That is, the audio processing unit 230 outputs an audio signal through the speaker (SPK) and performs a function for receiving an input of an audio signal through the microphone (MIC). The audio processing unit 230 receives audio data from the controller 170, converts the received audio data into analog signals, that is, into audio or sounds by D/A conversion, and then outputs the analog signals through the speaker (SPK). The audio processing unit 230 receives analog signals, that is, audio, voice, or sounds, from the microphone (MIC), converts the analog signals into audio data by A/D conversion, and then provides the audio data to the controller 170. The speaker (SPK) converts the analog signals received from the audio processing unit 230 into sound waves, and outputs the sound waves. The microphone (MIC) converts the sound waves transmitted from a person or other sound sources into analog signals.

The camera 240 photographs or video-captures a subject and outputs the photo or video of the subject, in the form of image data, to the controller 280 under the control of the controller 280. Specifically, the camera 240 may include a lens for collecting light, an image sensor (e.g., a complementary metal oxide semiconductor (CMOS) or a charge coupled device (CCD)) for converting the light into electric signals, and an image signal processor (ISP) for A/D converting electric signals input from the image sensor into image data and outputting the image data to the controller 280.

The ISP of the camera 240 may further include a display control module for processing image data to be a preview image (e.g., adjusting the resolution (resizing) to fit the screen size of the display unit 210) and outputting the preview image to the controller 280, and a coding module for coding image data (e.g., compressing the data to be in an MPEG format) and outputting the coded data to the controller 280. The controller 280 may display the preview image on the display unit 210. Further, the controller 280 may store the coded video in the storage unit 220.

The wireless communication unit 245 performs a voice call, a video call and/or data communication under the control of the controller 280. To this end, the wireless communication unit 245 may include a wireless frequency transmission unit for up-converting and amplifying the frequency of the transmitted signal, and a wireless frequency reception unit for low-noise amplifying and down-converting the frequency of the received signal. Further, the wireless communication unit 245 may include a mobile communication module (e.g., a 3-generation mobile communication module, a 3.5-generation mobile communication module or a 4-generation mobile communication module), a digital broadcast module (e.g., a DMB module), and a local communication module (e.g., a wireless communication module implementing, for example, WI-FI, a wireless technology for data exchange over a computer network, commercially available from the WI-FI ALLIANCE, and a short range wireless commination module implementing BLUETOOTH, a short range wireless communications technology at the 2.4 GHz band, commercially available from the BLUETOOTH SPECIAL INTEREST GROUP, INC.).

The peripheral device interface 250 connects peripheral devices 210, 230 and 240 to the storage unit 220, the CODEC 260 and the controller 280 through the bus 270.

The CODEC 260 includes the decoder 261 and the coder 262. The decoder 261 decodes the data (e.g., a video) input from the storage unit 220, the wireless communication unit 240, the camera 240 or the controller 280, and outputs the decoded data to the touch screen 210. Further, the coder 262 codes (encoding; e.g., compressing data to be a format such as AVI and MPEG) the data (e.g., a video) input from the camera 240 or the controller 280 under the control of the controller 280.

The bus 270 may be an electric circuit or other known communication interfaces and components for conveying a signal flow between the components. The bus 270 may be classified into an industry standard architecture bus (ISA bus), an extended industry standard architecture bus (EISA bus), a video electronics standards association bus (VESA bus), and a peripheral component interconnect bus (PCI bus), etc.

The controller 280 controls overall operation of the apparatus 200 and the signal flow between internal components of the apparatus 200, and performs a function of processing data. Further, the controller 280 controls a power supply from a battery or other known power sources to the internal components. In an exemplary embodiment, the controller 280 is a physical controller and/or includes hardware. The controller 280 may include a central processing unit (CPU) 281 and a graphic processing unit (GPU) 282. In an exemplary embodiment, the CPU 281 and the GPU 282 are physical components and/or include hardware.

The CPU 281 is a core control unit of a computer system for calculating and comparing data, and analyzing and executing a command. The GPU 282 is a control unit for calculating and comparing the graphic-related data and analyzing and executing a command on behalf of the CPU 281. The processors 281 and 282 may be integrated as one package in which two or more independent cores (e.g., quad-core; as shown in FIG. 2) are formed as a single integrated circuit, respectively. Further, the CPU 281 and the GPU 282 may be integrated into one chip (such as a system-on-chip (SoC) implementation). Further, the CPU 281 and the GPU 282 may have been packaged as a multi-layer device or component. In one exemplary embodiment, the configuration including the CPU 281 and the GPU 282 may be referred to as the application processor (AP). In a broader sense, the configuration including the CPU 281, the GPU 282, the bus 270, the CODEC 260 and interfaces 225 and 250 may be referred to as the application processor.

The multi-play of videos according to the present invention may be performed using the CPU 281 for display on the display unit 210. For example, at least one of the first to fourth cores (core 0 to core 3) may generate video clips and output the video clips on the touch screen 211. Further, the multi-play of videos may also be performed using the GPU 282. For example, at least one of the first to fourth cores (core 0 to core 3) of the GPU 282 may convert the videos into video clips and output the video clips on the touch screen 210. In addition, the multi-play of the videos according to the present invention may also be performed in both the CPU 281 and the GPU 282. For example, as a first core in either of CPU 281 of the GPU 282 controls the decoder 261 to decode videos, and as a first core in either of CPU 281 of the GPU 282 controls the controller 280 to decode videos using software, a third core in either of CPU 281 of the GPU 282 performs the simultaneous multi-play of the videos. The functions of the controller 280 according to the present invention will be described later in more detail.

The apparatus 200 may be modified in various implementations known in the art along with the convergence trend of digital devices, and thus not all such modifications may be listed here, but the apparatus 200 according to the present invention may further include known components that are not mentioned above, such as a GPS module, a vibration motor, and a wired communication module for wired connection with an external device (e.g., a personal computer, etc.). Further, some components of the apparatus 200 of the present invention may be excluded or may be substituted by other components depending on the various applications and functions supported by the apparatus 200, such as default applications and functions implemented during manufacture of the apparatus, or depending on user selections to configure the apparatus 200.

Figure 3:
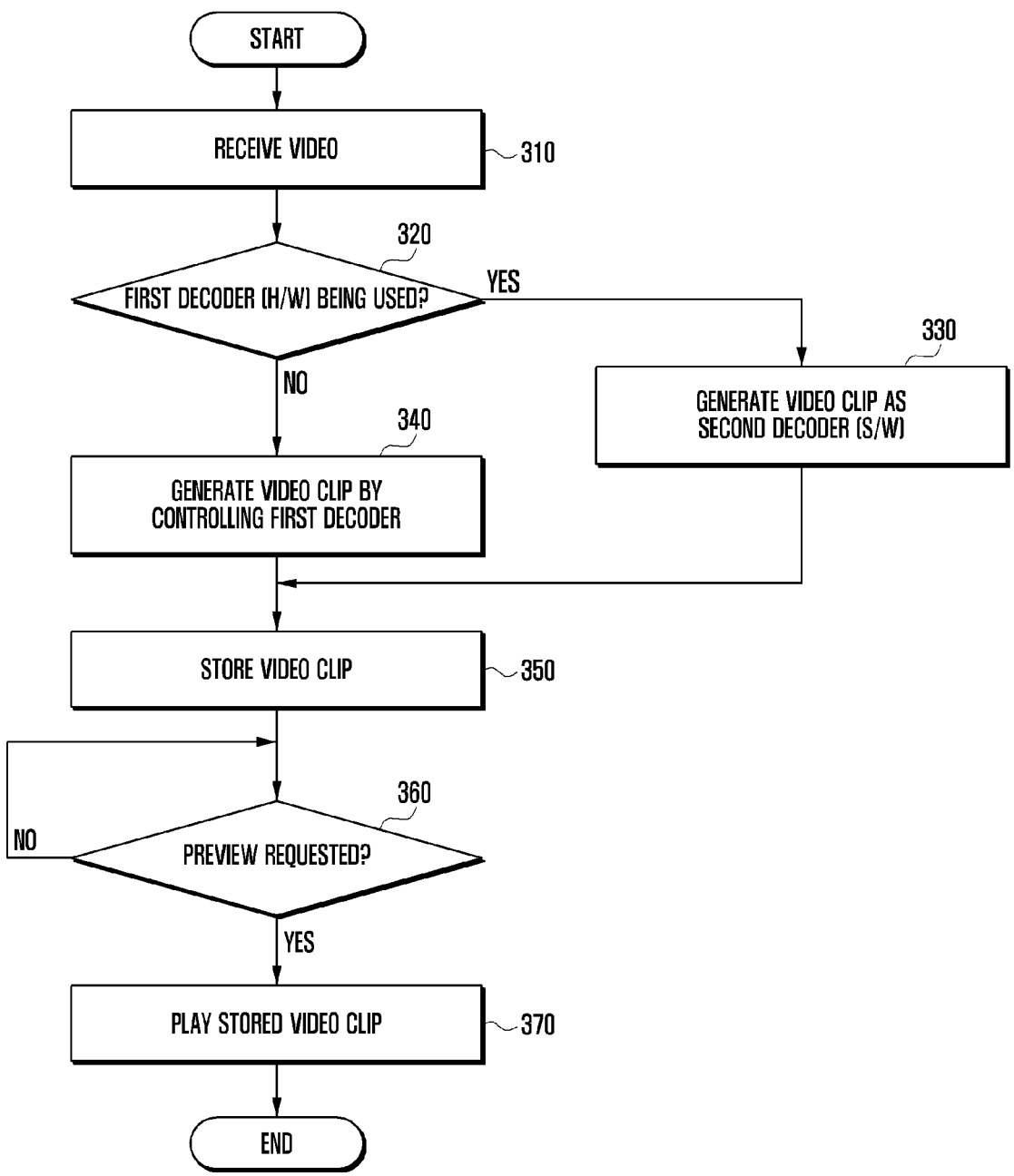
FIG. 3 is a flowchart illustrating a method of multi-playing videos according to the exemplary embodiment of the present invention.

FIG. 3 is a flowchart illustrating a method of multi-playing videos according to the exemplary embodiment of the present invention.

Referring to FIG. 3, the controller 280 may receive a video from a source external to the apparatus 200 through the wireless communication unit 245 in step 310. In addition, the controller 280 may receive a video from an external device (e.g., a PC) connected by a wired line. The controller 280 may store, in the storage unit 200, a video received from the external source. Further, the controller 280 may receive a video from the camera 240 at step 310. If the camera 240 outputs raw video data (e.g., a non-coded video), the controller 280 transmits the raw video data, such as originally captured video, received from the camera 240 to the coder 262 to be coded, and stores the coded video in the storage unit 220. Here, the controller 280 itself may code the raw video data and store the coded data in the storage unit 220.

The controller 280 determines whether the first decoder, implemented as hardware (H/W), i.e., the decoder 261 is in use in step 320. In other words, the controller 280 determines whether the decoder 261 is currently working (e.g., decoding, resizing, etc.).

If the first decoder is in use, the controller 280 using software (S/W) decodes the original video (i.e., the received video) to operate as a second decoder, reduces the decoded original video and generates a video clip in step 330, and proceeds to step 350. At this time, as described with reference to FIG. 1, the whole or a part of the original video may be converted into a video clip. Further, the video clip may have been only decoded from the original video without reduction. In the controller 280, in one exemplary embodiment, only one core may generate a video clip. Alternatively, a plurality of cores may participate in generation of a video clip. That is, the cores respectively perform the role of the decoder. For example, referring to FIGS. 1 and 2, if the controller 280 receives the first video (video 1) and the second video (video 2), the first core (core 0) of the CPU 281 may generate a video clip on chapters C1 and C2 of the first video (video 1), and the second core (core 1) of the CPU 281 may generate a video clip on chapters C3 to C5 of the first video (video 1). Further, the first core (core 0) of the GPU 281 may generate a video clip for chapters C1 and C2 of the second video (video 2), and the second core (core 2) of the GPU 282 may generate a video clip for chapters C3 to C5 of the second video (video 2). Hence, several video clips may be simultaneously and quickly generated.

Referring back to FIG. 3, if the first decoder is not in use as determined in step 320, (e.g., if the playing of a video is temporarily stopped, if the screen is turned off, if the first decoder is at an idle state, etc.), the controller 280 controls the first decoder 261, as a hardware-based decoder, to decode the original video (i.e., the received video), and reduce the decoded original video, or alternatively, as described above, reduction may not be performed, so as to generate a video clip in step 340. At this time, at step 340, the controller 280 (e.g., at least one of the cores of the CPU 281) may also participate in generation of the video clip.

After steps 330 and 340, the controller 280 stores the video clip generated in step 330 or step 340 in the storage unit 220 in step 350.

The controller 280 determines whether there has been a preview request in step 360. For example, the display unit 210 may display an application execution screen (e.g., an execution screen of a video player) including a button for a "video preview" under the control of the controller 280. The controller 280 may detect a user's gesture (e.g., a tap) on a video preview button, i.e., a preview request event, on the display unit 210.

If no preview request is received in step 350, the method loops back and repeatedly checks for receipt of a preview request in step 350. After the preview request is eventually received in step 350, the controller 280 simultaneously plays pre-stored video clips in response to the preview request event in step 370. For example, one or more cores may output video clips to the display unit 210 such as one or more cores of only the GPU 282. Further, one or more cores in the CPU 281 and the GPU 282 may output the video clips to the display unit 210. Further, the controller 280 may control the decoder 261 to output the video clips to the display unit 210.

Further, at step 370, if only a part of the video clips stored in the storage unit 220 has been decoded in the video, the simultaneous playing of the part of the video clips is performed, a new video clip is generated for the other non-decoded part, and the newly generated video clip may be stored in the storage unit 220. That is, the controller 280 generates a new video clip to allow a continuous preview. At this time, the simultaneous playing is performed by one of the cores of the CPU 281 and/or the GPU 282, and the generation and storing of the video clip may be performed by at least one other core. Further, the simultaneous playing may be performed by the CPU 281, and the generation and storing of the video clip may be performed by the GPU 282, or alternatively, the simultaneous playing may be performed by the GPU 282 and the generation and storing of the video clip may be performed by the CPU 281.

According to the exemplary embodiment described with reference to FIG. 3, when a video is newly generated or is newly downloaded from a source external to the apparatus 200, a video clip for the video is automatically generated and is stored in the storage unit 220. That is, video clips corresponding to respective videos are stored in advance. When the hardware-based decoder (H/W) is in use, the controller 280 may directly generate a video clip by the controller 280 functioning as a software-based decoder (S/W). If there is a preview request in a state where the video clips are stored in advance, the controller 280 simultaneously generates video clips stored in the storage unit 220. That is, the controller 280 may intuitively show, to the user, the high performance of the apparatus 200 implementing, for example, a portable terminal by simultaneously playing video clips without a buffering time (i.e., without a process of decoding and reducing a video).

Figure 4:
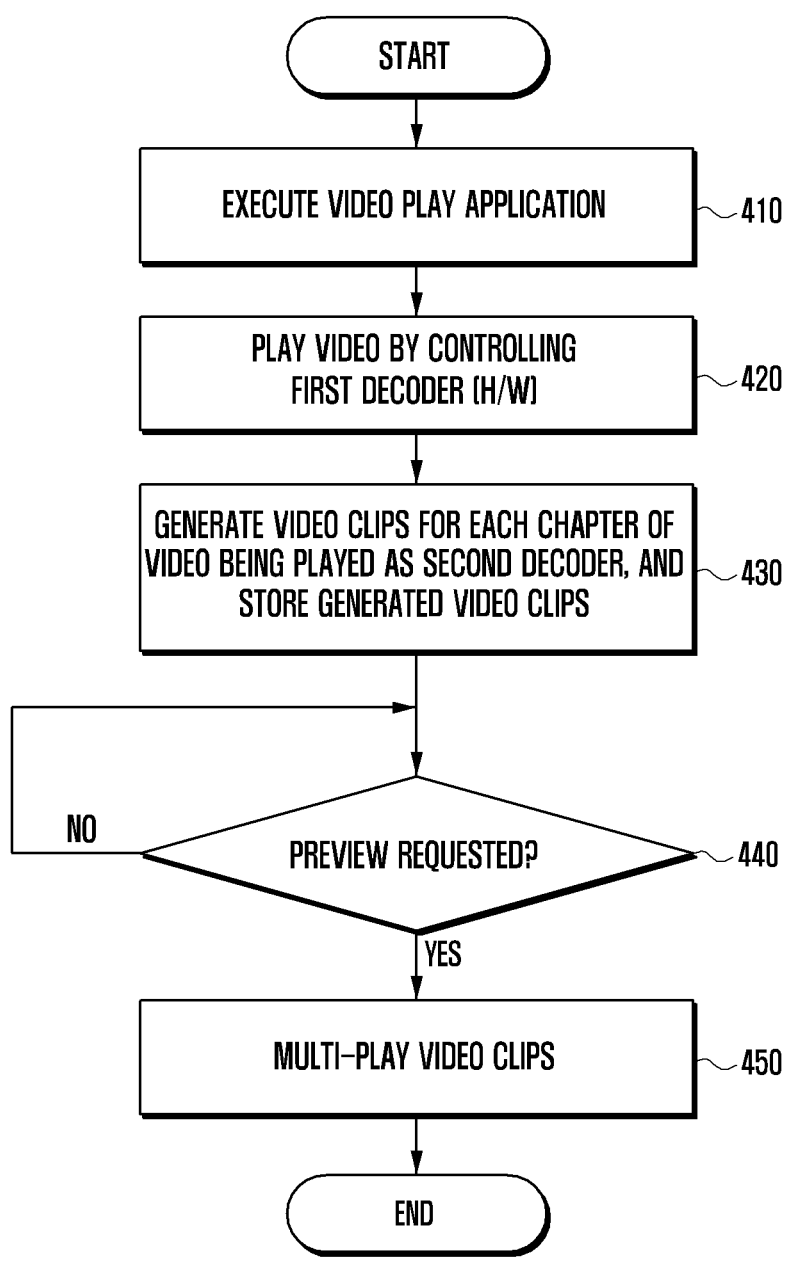
FIG. 4 is a flowchart illustrating a method of multi-playing videos according to an alternative exemplary embodiment of the present invention.
Figure 5:
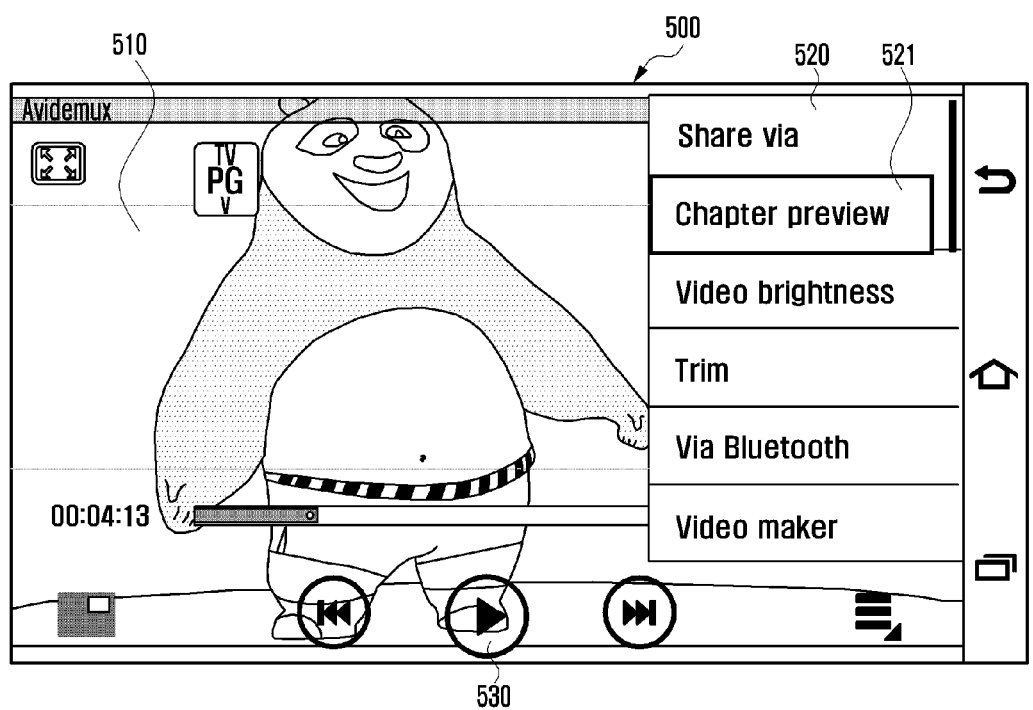
FIGS. 5 and 6 are screen examples illustrating the method of multi-playing videos of the present invention.
Figure 6:
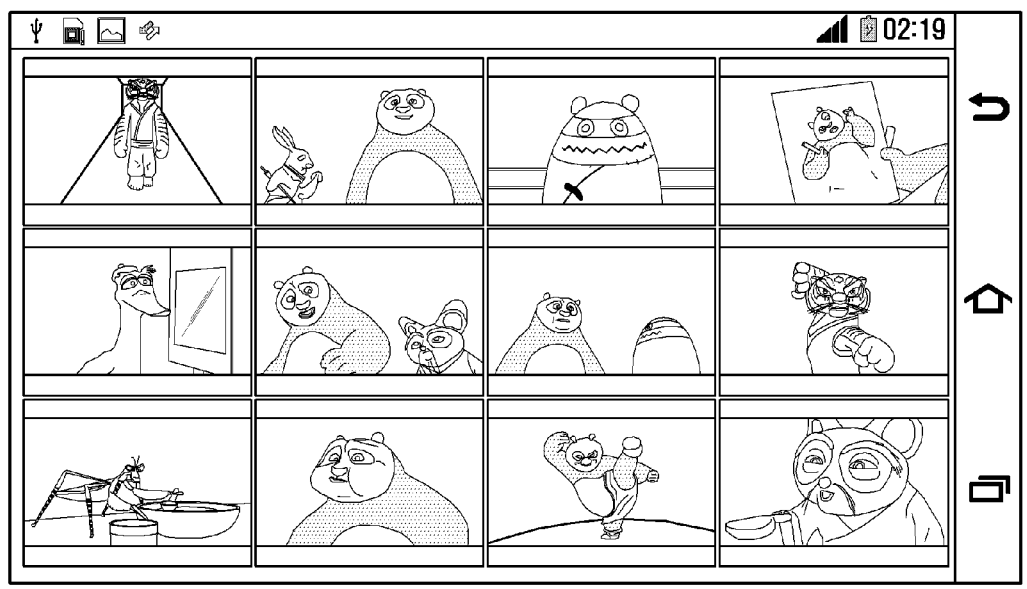

FIG. 4 is a flowchart illustrating a method of multi-playing videos according to an alternative exemplary embodiment of the present invention. FIGS. 5 and 6 are screen examples illustrating the method of multi-playing videos of the present invention.

Referring to FIGS. 4 and 5, the display unit 210 may display a home screen under the control of the controller 280. The controller 280 may detect selection of an icon (e.g., tapping the icon) corresponding to the video player application in the home screen. The controller 280 executes a video player in response to the selection of the video player icon in step 410. The display unit 210 may display an execution screen 500 of the video player, as shown in FIG. 5, under the control of the controller 280. The execution screen 500 of the video player may include a video play screen 510 and a menu screen 520.

The controller 280 may detect a play request event (e.g., tapping a tab representing a play button 530). If a play request event is detected, the controller 280 may control the first decoder (H/W), i.e., the decoder 260, to play a video in step 420. That is, the decoder 261 decodes a video and outputs the decoded video on the display unit 210, and the display unit 210 converts the video by D/A conversion, and displays the converted video on the video play screen 510 under the control of the controller 280. Here, the replayed video may be a previously replayed video or a video selected by the user from a video list displayed on the execution screen 500 or on other displayed screens. Further, the control of the video playing may be performed by at least one core (e.g., core 0 of the CPU 281) in the controller 280.

The controller 280 performs a role of the second decoder in step 430. That is, in the controller 280, at least one core (e.g., core 1 to core 3 of the CPU 281) may generate video clips for respective chapters of the video being played, and may temporarily store the generated video clips in the storage unit 220. That is, if a chapter preview is requested, the controller 280 may generate video clips in advance and store the video clips so that the video clips may be simultaneously played without buffering time (i.e., without a process of decoding and reducing a video).

The controller 280 determines whether a preview has been requested in step 440. For example, the controller 280 may detect the selection (e.g., tapping a tab) of the chapter preview button 521 from the menu screen 520.

If no preview request is received in step 440, the method loops back and repeatedly checks for receipt of a preview request in step 440. After the preview request is eventually received in step 440, the method proceeds to step 450, in which, as illustrated in FIG. 6, the controller 280 may simultaneously play pre-stored video clips stored in the storage unit 220 in response to the chapter preview request. For example, one or more cores in the CPU 281 or one or more cores from the GPU 282 may output the video clips to the display unit 210. Further, one or more cores respectively from the CPU 281 and the GPU 282 may output the video clips to the display unit 210. Further, the controller 280 may control the decoder 261 to output the video clips to the display unit 210.

Further, the controller 280 may multi-play video clips stored in advance in the storage unit 220, and may generate new video clips and store the generated video clips in step 450. That is, the controller 280 generates new video clips to allow a continuous preview. At this time, the simultaneous playing of video clips (multi-play) is processed by one of cores of the CPU 281 or the GPU 282, and at least one other core in the CPU 281 and/or the GPU 282 may process the generation and storing of the video clips. Further, the simultaneous playing may be processed by the CPU 281 and the generation and storing of the video clips may be processed by the GPU 282.

According to the exemplary embodiment described with reference to FIGS. 4 to 6, if a video is being played by the hardware-based decoder 261 in the apparatus 200, so that the hardware-based decoder is in use, the controller 280 generates video clips for each chapter of the video being played using the controller 280 as a software-based decoder. Likewise, if a chapter preview is requested in a state in which video clips are stored in advance, the controller 280 simultaneously plays video clips for each chapter stored in the storage unit 220. That is, the controller 280 may intuitively show, to the user, the high performance of the apparatus 200 to implement, for example, a portable terminal by multi-playing video clips without buffering time.

The foregoing method for playing a plurality of videos of the present invention may be implemented in an executable program command formed by various computer devices and components, and may be recorded in a computer readable recording medium. In this case, the computer readable recording medium may include a program command, a data file, and a data structure individually or a combination thereof. In the meantime, the program command recorded in a recording medium may be specially designed or configured for the present invention or may be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

According to the present invention, a plurality of videos is simultaneously replayed, and thus the high performance of a portable terminal may be intuitively shown to a user.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of multi-playing videos in an apparatus having a first decoder for decoding a video having a given playback duration, and a controller, the method comprising:
   determining, by the controller, whether the first decoder is decoding the video;
   if the first decoder is decoding the video, generating video clips from the video, each video clip being a continuous temporal portion of the video, by decoding and reducing the video using the controller as a second decoder;
   storing the decoded and reduced video clips in a storage unit separately from the video; and
   simultaneously playing the decoded and reduced video clips stored in the storage unit without decoding time in response to detection of a preview request event.

2. The method of claim 1, wherein the controller includes a central processing unit (CPU) composed of a plurality of cores;
   wherein the generating of the video clips includes controlling the first decoder by a first core of the plurality of cores to generate a first plurality of video clips, and generating a second plurality of video clips using the controller using at least a second core.

3. The method of claim 2, further comprising:
   controlling the first decoder to generate the first plurality of video clips by the first core of the plurality of cores if the first decoder is not decoding the video.

4. The method of claim 1, wherein the controller includes a central processing unit (CPU) composed of a plurality of cores;
   wherein the simultaneous playing includes displaying the video clips stored in the storage unit by at least one core of the plurality of cores.

5. The method of claim 1, wherein the determining of whether the first decoder is decoding the video is performed when the video is newly generated in the apparatus or the apparatus receives the video from an external source.

6. A method performed in a device having a first decoder for decoding videos, the method comprising:
   using the first decoder, decoding a video which is stored in a storage unit of the device and has a plurality of chapters;
   playing the decoded video;
   while playing the decoded video, generating video clips from the video, each video clip being a continuous temporal portion of the video, by decoding and reducing at least a part of each chapter of the video using a second decoder;
   storing the decoded and reduced video clips in the storage unit separately from the video; and
   simultaneously playing the decoded and reduced video clips stored in the storage unit without decoding time in response to detection of a preview request event.

7. The method of claim 6, wherein the device includes a controller having a processor composed of a plurality of cores;
   wherein the playing of the video includes controlling the first decoder using a first core of the plurality of cores; and
   wherein the generating of the video clips includes generating at least one video clip by at least a second core of the plurality of cores.

8. The method of claim 6, wherein each video clip is only a beginning part of a corresponding one of the chapters, and the method further comprising:
   generating and storing additional video clips for other parts of the chapters when the simultaneous playing of the video clips is performed.

9. The method of claim 6, wherein further video clips are generated during an idle time of the device.

10. The method of claim 6, further comprising deleting the video clips when the playing of the video is completed.

11. The method of claim 6, further comprising automatically deleting the video clips at a predetermined time after the video clips are stored.

12. The method of claim 6, further comprising automatically deleting the video clips that have been stored for more than a predetermined time when a memory space of the device has been reduced to less than a threshold.

13. An apparatus for multi-playing videos, the apparatus comprising:
   a storage unit for storing the videos;
   a first decoder for decoding a video, the video having a given playback duration;
   a display unit for displaying the decoded video; and
   a controller for controlling the storage unit, the first decoder and the display unit;
   wherein the controller:
      determines whether the first decoder is decoding the video, generates video clips from the video, each video clip being a continuous temporal portion of the video, by decoding and reducing the video if the first decoder is decoding the video,
      stores the decoded and reduced video clips in the storage unit separately from the video, and
      simultaneously plays the decoded and reduced video clips stored in the storage unit without decoding time in response to detection of a preview request event.

14. The apparatus of claim 13, wherein the controller further reduces the video clips.

15. The apparatus of claim 14, wherein the controller includes a central processing unit composed of a plurality of cores;
   wherein a first core of the plurality of cores controls the first decoder, and at least a second core of the plurality of cores generates the video clips.

16. The apparatus of claim 15, wherein the controller controls the first decoder to generate the video clips by the first core of the plurality of cores if the first decoder is not decoding the video.

17. The apparatus of claim 14, wherein the controller includes a central processing unit composed of a plurality of cores;
   wherein at least one core of the plurality of cores plays on the display unit the video clips stored in the storage unit.

18. An apparatus comprising:
a storage unit for storing a video having a plurality of chapters;
a first decoder for decoding the video;
a display unit for displaying the decoded video; and
a controller for controlling the storage unit, the first decoder, a second decoder, and the display unit,
wherein the controller controls the first decoder to decode and play the video, and operates as a second decoder to generate video clips from the video while the first decoder is decoding the video, each video clip being a continuous temporal portion of the video, by decoding and reducing at least a part of each chapter of the video, controls storing of the decoded and reduced video clips in the storage unit separately from the video, and simultaneously plays the decoded and reduced video clips without decoding time in response to detection of a preview request event.

19. The apparatus of claim 18, wherein the controller includes a central processing unit composed of a plurality of cores, wherein a first core of the plurality of cores controls the first decoder, and at least a second core of the plurality of cores configures the second decoder which generates the video clips.

20. A non-transitory recording medium readable by an apparatus having a first decoder for decoding video and a controller, in which a program for executing a method is recorded thereon, the program when accessed by the controller causes the controller to execute:
determining whether the first decoder is decoding the video;
if the first decoder is decoding the video, generating video clips from a video having a given playback duration, each video clip being a continuous temporal portion of the video, by decoding and reducing the video using the controller as a second decoder;
storing the decoded and reduced video clips in a storage unit separately from the video; and
simultaneously playing the decoded and reduced video clips stored in the storage unit without decoding time in response to detection of a preview request event.

\* \* \* \* \*